Patented Mar. 31, 1931

1,798,593

UNITED STATES PATENT OFFICE

HERBERT W. DAUDT, OF PENNS GROVE, NEW JERSEY, ASSIGNOR TO E. I. DU PONT DE NEMOURS & COMPANY, OF WILMINGTON, DELAWARE, A CORPORATION OF DELAWARE

PREPARATION OF TETRA ALKYL LEAD

No Drawing.    Application filed January 20, 1927.   Serial No. 162,418.

This invention relates to the preparation of tetra alkyl lead from magnesium, an alkyl halide and a lead salt, and more particularly to an improvement in which the reactions of the magnesium, the alkyl halide and the lead salt are allowed to take place simultaneously.

It has been the practice in the past in the preparation of tetra alkyl lead to allow the reaction between the alkyl halide and magnesium metal to go on to completion to form the intermediate before any or all of it is used for the preparation of tetra alkyl lead. The completed solution of the intermediate has then been transferred to another receptacle containing the suitably suspended lead salt, or the lead salt has been added to the solution of the completed intermediate.

This necessitates the transferring of ether solutions from one piece of plant equipment to another. In addition, the intermediate, magnesium alkyl halide, is extremely sensitive to the moisture of the air, and the presence of even small amounts of water has an undesirable influence on the reaction. Therefore, the less these solutions are handled or exposed, the more advantageous and successful is the operation.

When the reaction mass is drowned in water two layers are formed, the one consisting of ether with the tetra ethyl lead dissolved therein, and the other of water containing magnesium oxide or hydroxide or possibly both in suspension. On removal of the ether by distillation, a layer of tetra ethyl lead is formed which is then distilled leaving the magnesium oxide in the residue. By reason of the fact that ether is quite insoluble in water, the amount of water required to drown the reaction mass is insufficient to dissolve it. As will be apparent other methods may, of course, be used for separating the tetra ethyl lead, such, for example, as a mechanical separation of the two layers followed by distillation of the ether.

An object of this invention is to simplify the preparation of tetra alkyl lead. This invention has as a further object the development of the preparation of tetra alkyl lead into a one-stage process. Other objects will appear as the description proceeds.

These objects are accomplished by the following invention: The required raw materials, magnesium metal, alkyl halide and lead salt are added together in a suitable receptacle and under suitable conditions, and the mixture allowed to react.

The production of the tetra alkyl lead in this process is rather unique in that the magnesium alkyl halide formed by the reaction of magnesium and the alkyl halide instantly reacts upon its formation with the lead salt present to form the tetra alkyl lead.

This invention may be better understood from the following example which by way of illustration indicates an embodiment of my present invention.

Place a suspension of 30 parts of lead chloride and 10 parts of magnesium turnings in 200 parts of anhydrous ether in a suitable receptacle, provided with a good return condenser. Add 5 parts of ethyl bromide. gradually raise the temperature to 30–35° C. If the reaction is too energetic, as indicated by a very active ebullition, slightly cool the mass by submerging the containing receptacle in water. Usually, a period of 10–30 minutes is required to start the reaction, and sometimes it will not start until more ethyl bromide has been added. Cautiously add more ethyl bromide until a total of 50 parts has been added, maintaining the temperature at approximately the boiling point (35–39° C.). After the reaction once starts it is usually unnecessary to supply heat. Maintain the mass at the boiling temperature for 12 hours after all the ethyl bromide has been added.

Cautiously drown the charge in water and add just enough caustic soda solution to impart a red color to brilliant yellow paper. Remove the ether by careful, low temperature distillation, and, finally, distill the tetra ethyl lead with steam.

For the preparation of other tetra alkyl lead derivatives it is only necessary to substitute ethyl bromide by the alkyl bromide having the desired alkyl group.

In the place of the alkyl bromide there may be used either the corresponding alkyl iodide or the alkyl chloride. Where the chloride is used it is usually essential to have present one of the usual catalysts, such as methyl iodide and iodine, which are generally known to catalyze the reaction of alkyl chlorides on metallic magnesium. A material excess of the alkyl chloride, as indicated in the case of alkyl bromide, tends to promote the desired reaction and to decrease the percentage of undesirable products. The given temperatures are preferred, although other temperatures may be used.

Diluents such as gasoline, benzene, toluene, etc., may be present but should not be used to entirely displace the other.

Lead chloride is suggested above, but this may be replaced by any anhydrous lead salt.

It is also possible to add the magneisum metal to a suspension of a lead salt in a mixture of ether and alkyl halide.

As many apparently widely different embodiments of this invention may be made without departing from the spirit thereof, it is to be understood that I do not limit myself to the foregoing example or description except as indicated in the following patent claims.

I claim:

1. The process of producing tetra ethyl lead, which comprises effecting a reaction between lead chloride and the reaction product of magnesium and ethyl chloride, simultaneously with the formation of said reaction products, and in the presence of an excess of ethyl chloride over that theoretically required to form the magnesium ethyl chloride.

2. The process of producing tetra ethyl lead, which comprises effecting a reaction between lead chloride and the reaction product of magnesium and ethyl chloride, simultaneously with the formation of said reaction products, and in the presence of an excess of ethyl chloride over that theoretically required to form the magnesium ethyl chloride, and of a Grignard reaction catalyst.

3. In the process of producing tetra alkyl lead, reacting a lead salt with the reaction products of magnesium and an alkyl halide simultaneously with the formation of said reaction products.

4. In the process of producing tetra alkyl lead, reacting lead chloride with the reaction products of magnesium and an alkyl halide simultaneously with the formation of said reaction products.

5. In the process of producing tetra alkyl lead, reacting a lead salt with the reaction products of magnesium and an ethyl halide simultaneously with the formation of said reaction products.

6. In the process of producing tetra alkyl lead, reacting lead chloride with the reaction products of magnesium and an ethyl halide simultaneously with the formation of said reaction products.

7. The invention of claim 3 in which the reaction temperature is maintained between 28° and 40°.

8. The invention of claim 4 in which the reaction temperature is maintained between 28° and 40° C.

9. The invention of claim 5 in which the reaction temperature is maintained between 28° and 40° C.

10. The invention of claim 6 in which the reaction temperature is maintained between 28° and 40° C.

11. The invention of claim 3 in which the reaction is maintained for a period of approximately 12 hours.

12. The invention of claim 4 in which the reaction is maintained for a period of approximately 12 hours.

13. The invention of claim 5 in which the reaction is maintained for a period of approximately 12 hours.

14. The invention of claim 6 in which the reaction is maintained for a period of approximately 12 hours.

In testimony whereof I affix my signature.

HERBERT W. DAUDT.

CERTIFICATE OF CORRECTION.

Patent No. 1,798,593.     Granted March 31, 1931, to

HERBERT W. DAUDT.

It is hereby certified that error appears in the printed specification of the above numbered patent requiring correction as follows: Page 1, lines 28 to 44, strike out the words "When the reaction mass is drowned in water two layers are formed, the one consisting of ether with the tetra ethyl lead dissolved therein, and the other of water containing magnesium oxide or hydroxide or possibly both in suspension. On removal of the ether by distillation, a layer of tetra ethyl lead is formed which is then distilled leaving the magnesium oxide in the residue. By reason of the fact that ether is quite insoluble in water, the amount of water required to drown the reaction mass is insufficient to dissolve it. As will be apparent other methods may, of course, be used for separating the tetra ethyl lead, such, for example, as a mechanical separation of the two layers followed by distillation of the ether.", and insert the same to follow line 93, of same page; and that the said Letters Patent should be read with this correction therein that the same may conform to the record of the case in the Patent Office.

Signed and sealed this 5th day of May, A. D. 1931.

(Seal)

M. J. Moore,
Acting Commissioner of Patents.